(12) United States Patent
Hamann et al.

(10) Patent No.: US 7,096,365 B1
(45) Date of Patent: Aug. 22, 2006

(54) DIGITAL SIGNATURE

(75) Inventors: Ernst-Michael Hamann, Boeblingen (DE); Jutta Kreyss, Stuttgart (DE); Narayanan Vasudevan, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,632

(22) Filed: Jan. 27, 2000

(30) Foreign Application Priority Data

Jan. 29, 1999 (EP) .................................. 99101913

(51) Int. Cl.
*H04L 9/00* (2006.01)
*H04K 1/00* (2006.01)

(52) U.S. Cl. .................... 713/180; 713/182; 713/184; 713/194; 713/170; 726/26; 726/2; 380/28; 380/30

(58) Field of Classification Search ................ 713/180
See application file for complete search history.

(56) References Cited

U.S. PATENT DOCUMENTS

| | | | |
|---|---|---|---|
| 5,005,200 A * | 4/1991 | Fischer | 380/30 |
| 5,214,702 A * | 5/1993 | Fischer | 380/30 |
| 5,448,639 A * | 9/1995 | Arazi | 380/30 |
| 5,521,980 A * | 5/1996 | Brands | 380/30 |
| 5,784,464 A * | 7/1998 | Akiyama et al. | 713/155 |
| 5,805,712 A * | 9/1998 | Davis | 713/173 |
| 6,021,491 A * | 2/2000 | Renaud | 713/179 |
| 6,076,162 A * | 6/2000 | Deindl et al. | 713/159 |
| 6,085,321 A * | 7/2000 | Gibbs et al. | 713/170 |
| 6,119,228 A * | 9/2000 | Angelo et al. | 713/180 |
| 6,209,099 B1 * | 3/2001 | Saunders | 713/200 |
| 6,516,414 B1 * | 2/2003 | Zhang et al. | 713/176 |
| 6,662,151 B1 * | 12/2003 | Schaefer-Lorinser | 713/185 |

* cited by examiner

*Primary Examiner*—Syed A. Zia
(74) *Attorney, Agent, or Firm*—Anne Vachon Dougherty

(57) ABSTRACT

The invention relates to the generation of digital signatures by the use of which the legally binding nature of a digital signature is enhanced. For this, an expanded digital signature is created which, in addition to the hash, contains other information, in particular information identifying the hardware and software environment used in generating the signature.

12 Claims, 4 Drawing Sheets

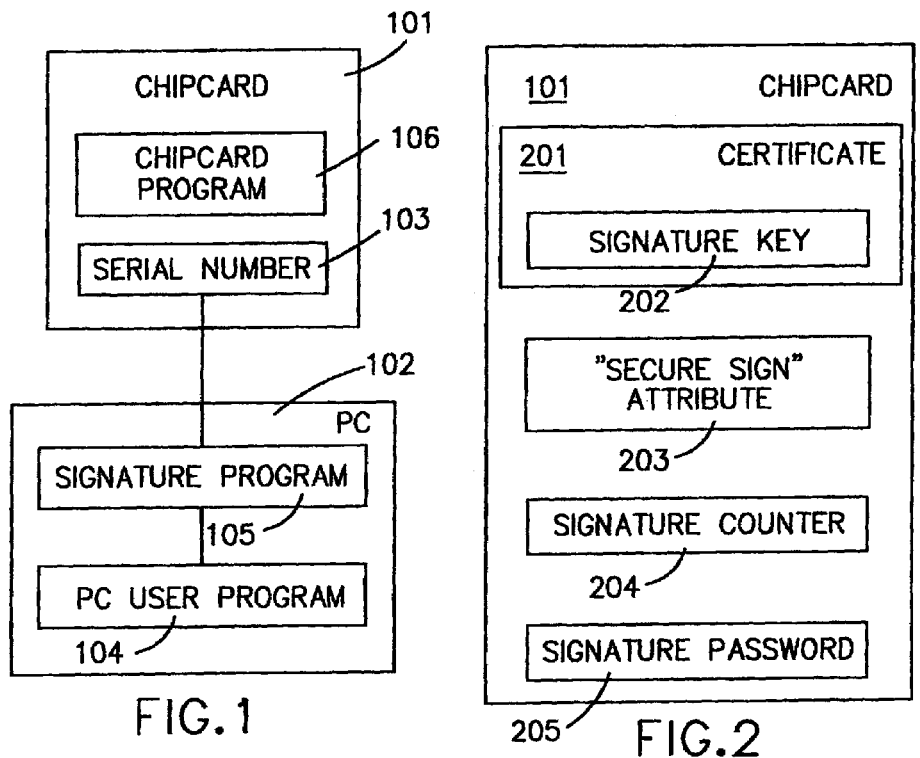
FIG.1
FIG.2
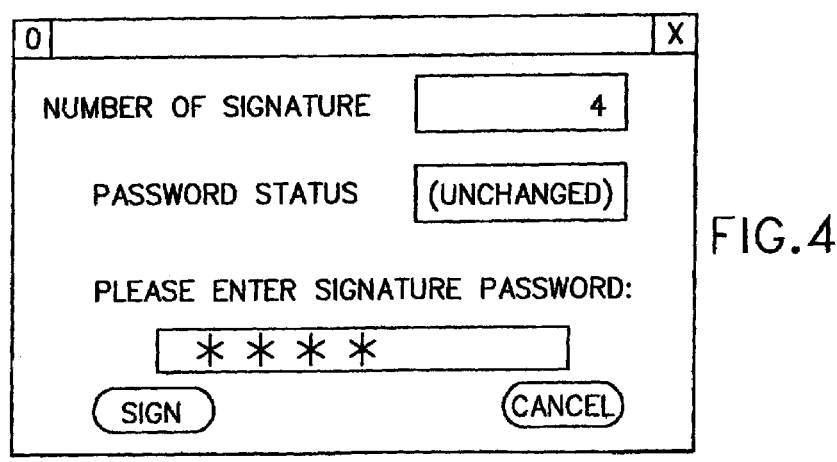
FIG.4

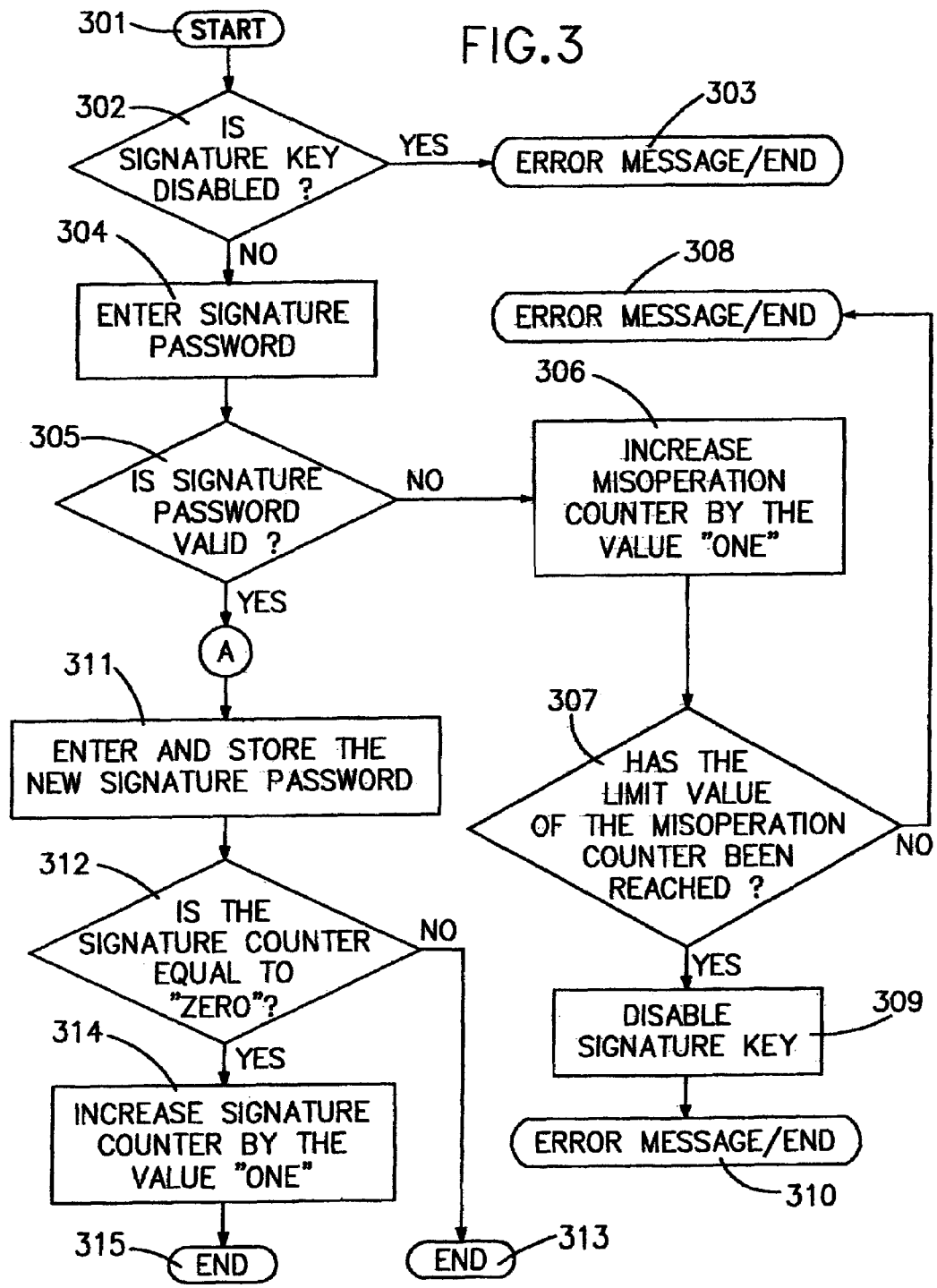

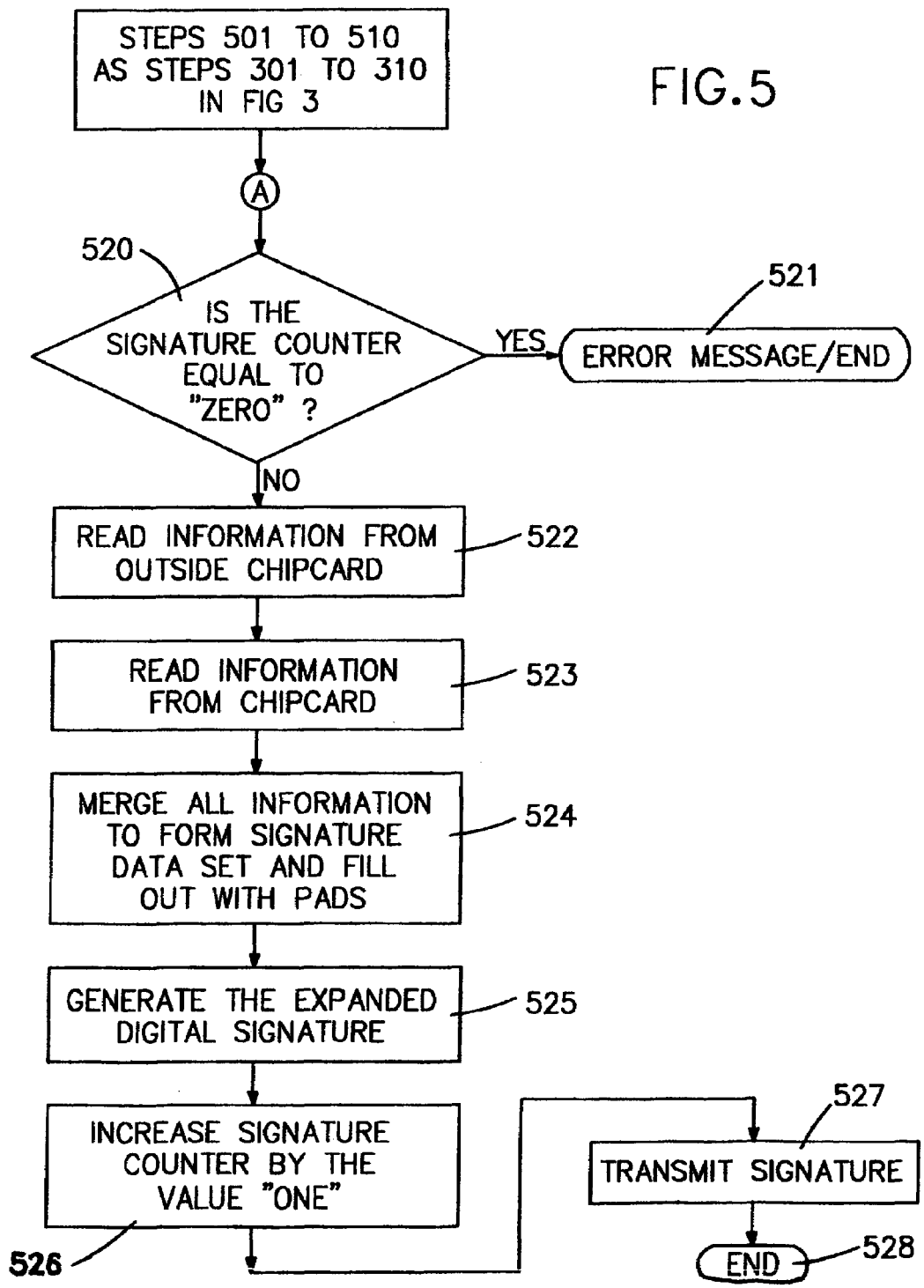

| BLOCK TYPE | PAD | HASH |
|---|---|---|
| 2 | 42/74/106 | 20 |

FIG.6

| BLOCK TYPE | PAD | DOCUMENT ID | DATE & TIME | CHIPCARD PROGRAM ID | CHIPCARD SERIAL NUMBER | SIGNATURE COUNTER | HASH |
|---|---|---|---|---|---|---|---|
| 2 | | | 7 | 16 | 16 | 4 | 20 |

FIG.7

DIGITAL SIGNATURE

FIELD OF THE INVENTION

The invention relates to digital signatures, methods for generating digital signatures, and signature devices to execute the methods.

BACKGROUND OF THE INVENTION

Digital signatures can be seen as the counterpart to handwritten signatures. The digital signature appended by a sender to an electronic document can be used to establish the sender's identity and the authenticity of the transmitted document. The legally binding nature of the digital signature is a key topic for public administration, for companies and, increasingly, for private individuals.

The principle of the digital signature is known. It is based on an asymmetric method in which each user is assigned two different keys: a private key and a public key. The public key is generally accessible. The prerequisite is that each pair of keys is unique. With the private key, which is usually on a chipcard, the digital signature is generated by the sender. The recipient of a document signed with a digital signature can separate the signature from the document using an appropriate software program and can decode the hash with the aid of the sender's public key, thereby verifying the authenticity of the document and the identity of the sender. This method can be used between natural persons and between hardware devices.

Methods of generating digital signatures are known. For example, signature devices are used which apply cryptographic methods such as the familiar RSA (Rivest-Shamia-Adleman cryptographic algorithm) public key method. In this, a document extract value (hash) generated by a hashing method such as MD5 (Message Digest #5) or SHA-1 (Secure Hashing Algorithm) is signed with the private key of the sender (encrypted) and appended to the document as a digital signature prior to dispatch.

In cryptographic methods it is necessary that the length of the digital signature matches the length of the key used, e.g. 512, 758 or 1024 bits. Since the size of the hash is only around 20 bytes, the unused area of the signature is filled out with filler characters (pads). Consequently, in a digital signature for example 108 bytes of these pads are stored and transported uselessly when a 1024-bit RSA key and the SHA-1 hashing algorithm are used.

In the known methods there is no unique allocation of the digital signature to a specific signature device. Thus it would be possible, for example, with the aid of a fake or stolen key and a signature device, to append a fake signature to a document. The legitimate owner of the key used has little or no chance of proving that such an unauthorized signature was indeed made without his or her knowledge.

It would also be possible that a manipulated or stolen signature device of the key holder may be used, together with a third-party program (virus), to sign documents without the knowledge of the key holder. This may also occur with no intervention from outside, for example as a result of faulty software or interfaces. Here, too, the key holder has little chance of proving the illegitimacy of the signatures generated.

It is therefore the object of the present invention to deliver a digital signature by the use of which the legally binding nature of a digital signature is enhanced.

SUMMARY OF THE INVENTION

The foregoing and other objects of the invention is fulfilled by the independent Claims. In accordance with the present invention, an expanded digital signature is created. The expanded digital signature contains other information in addition to the hash, in particular information identifying the hardware and software environment used in generating the signature. Through the expanded digital signature the legally binding nature and thus also the recognition of the digital signature is substantially enhanced.

BRIEF DESCRIPTION OF THE DRAWINGS

The invention is described in more detail in the following based on preferred embodiments.

FIG. 1 shows a schematic representation of the use of a chipcard to generate a digital signature;

FIG. 2 shows a schematic representation of a chipcard used to generate a digital signature in accordance with an embodiment of the invention;

FIG. 3 shows a flowchart for the method of releasing a signature key for use;

FIG. 4 shows a representation of a form for input of a signature password;

FIG. 5 shows a flowchart for the method of generating an expanded digital signature based on the present invention;

FIG. 6 shows a schematic representation of a digital signature based on the state of the art; and FIG. 7 shows a schematic representation of an expanded digital signature based on the present invention.

DETAILED DESCRIPTION OF THE INVENTION

In the preferred embodiment of the invention the signature device is software on a chipcard. A chipcard 101 of this kind is shown in FIG. 1. The invention is not restricted to chipcards, however. Other signature devices, such as crypto-adaptors, can be used. The chipcard is used here to sign a document created on a personal computer (PC) 102 for example. On the chipcard there is a chipcard program 106 which primarily serves to sign—that is to say, to encrypt—input data with the aid of a private key. The chipcard 101 is issued with a non-changeable and unique serial number 103. The originality of the serial number 103 can be verified by means of cryptographic keys stored on the chipcard, for example by the "external/internal authentication" method commonly used on chipcards.

A PC-based user program 104, such as Microsoft Outlook or Netscape Navigator, is used to send the document. As shown in FIG. 1, a special signature program 105 running on the PC 102 serves as the interface between the chipcard 101 with the chipcard program for the signing process 106 and the PC user program 104.

Before the chipcard 101 can be used for signing, a signature key 202, for example from a certification body, is transferred via the PC 102 onto the chipcard 101. In this, it is assumed that the holder of the signature key 202 is at the same time the owner of the chipcard 101. The signature key 202 can be transferred by means of the signature program 105 for example. The signature key 202 is stored by means of the chipcard program 106 on the chipcard 101 as a component element of a certificate 201. This is effected by creating a key object, for example by means of a "create object" command in the chipcard program 106. Further components of the certificate 201 are, for example, a name for the certificate and a designation for the encryption process employed.

Through the use of existing chipcard operating systems, for example the one described in ISO 7816-4, key objects—that is, including signature keys—can be stored securely on a chipcard. The signature key 202 stored in the memory of the chipcard, for example a private key of the RSA method, is protected within the chipcard operating system for example by the access conditions "Read=Never", "Update=CHV1", "Use=SignPW" (CHV1=Card Holder Verification #1).

To further increase security, when the key object is created the signature key 202 is stored together with a "secure sign" attribute 203, which after creation of the signature key 202 can no longer be changed. The "secure sign" attribute 203 distinguishes specific signature keys from other key objects such as are used for other types of encryption of data for example. No other cryptographic methods on the chipcard 101 can use this special signature key 202.

When each key object is created with the "secure sign" attribute 203, another attribute is generated which is logically linked to the signature key 202. A signature key with expanded attributes is created. This attribute is a signature counter 204. Thus each signature key 202 is assigned its own signature counter 204.

The signature counter 204 is a simple digital counter. In order to protect against manipulation, it is accommodated in the non-volatile memory on the chipcard 101. In the present example the signature counter 204 is 4 bytes long (a 32 bit integer). When the signature counter 204 is generated it is assigned the initial value "zero".

The size of the signature counter 204 is chosen such that, over a normal service life of the chipcard 101, the counter does not overflow through repeated use. After an overflow (value of all bits equal to "zero") use of the signature key 202 is internally disabled, in order to prevent abuse resulting from an intentionally provoked overflow. The signature counter 204 can be read as an attribute of the signature key 202 by the chipcard 101, but cannot be changed from the outside. This can be safeguarded, for example, by the chipcard operating system with the access condition "Read=Never".

In the preferred embodiment of the invention, security in creating a digital signature is increased further by provision of a unique confirmation of each digital signature by the holder of the signature key 202 every time a document is signed. This can be effected by input of an identifying characteristic, such as a password or a PIN (Personal Identification Number) for example, or by a biometric method such as scanning of a fingerprint. If the identifying characteristic is a password, for example, when each key object is created with the "secure sign" attribute, in addition to the signature counter 204 a further attribute, a signature password 205, is generated, which is in turn also logically linked to the signature key 202. Thus each signature key 202 is also assigned its own signature password 205. When generated, the signature password 205 is assigned an initial value, for example with the digits "123456".

Through the use of the signature password 205 unintentional signing of documents is prevented. The signature password 205 for use of the signature key 202 exists in addition to a password for use of the chipcard 101. This complies with a legal requirement in Germany that the password should be scanned for each signature being executed.

In the preferred embodiment of the invention, prior to generating the first signature with the signature key 202 the initial value of the signature password 205 must be changed to a customized value. This serves to increase security. When the chipcard 101 is issued, signing is only possible when this change has been made. FIG. 3 shows the process sequence for initial release of the signature key 202. On conclusion of this procedure the signature key 202 is released for digital signing.

In step 301 the method is started by the chipcard signing program 106. Then, in step 302, the chipcard program checks whether the signature key 202 is disabled, such as due to an overflow of the signature counter 204 or a defective item of hardware. If so, the chipcard program 106 in step 303 delivers an error message to the user of the chipcard 101 and automatically terminates.

If several signature keys 202 are stored on the chipcard 101, the user of the chipcard 101 can be enabled prior to step 302, for example by the chipcard program 106, to define which signature key 202 is to be used.

If the signature key 202 is not disabled, the user of the chipcard 101 is prompted, in step 304, to enter the signature password 205. The entered signature password 205 is compared against the valid stored signature password in step 505.

If the compared signature passwords are not identical, in step 306 a misoperation counter is increased by the value "one". The misoperation counter monitors the password status and is implemented on the chipcard 101. The password status may be defined by the states "unchanged", "changed" and "disabled", for example. Use of the signature key 202 is disabled if the number of failed attempts exceeds a predefined number (password status "disabled").

Then, in step 307, a check is made as to whether the predefined limit of the misoperation counter has been reached. If it has not, the chipcard program 106 in step 308 delivers an error message and terminates automatically. If the limit value has been reached, the chipcard program 106 disables the signature key 202 in step 309 and, in step 310, terminates automatically with an error message.

If the signature passwords compared in step 305 are identical, in step 311 the chipcard program 106 prompts the user of the chipcard 101 to enter a new, customized password 205. The entered new signature password 205 is stored on the chipcard 101 and is logically linked to the relevant signature key 202.

Then, in step 312, a check is made as to whether the signature counter 204 of the signature key 202 has the initial value "zero". If it does not, the procedure is aborted in step 313 and an error in the chipcard 101 or abuse of the signature key 202 is the likely cause. If the value of the signature counter 204 is "zero", in step 314 the signature counter 204 is increased to the value "one" and the procedure is terminated by step 315.

In a preferred embodiment of the invention as shown in FIG. 4, the value of the signature counter 204 and the password status may be displayed to the user of the chipcard 101 before and/or during the password change operation. If the signature counter 204 is not set to the value "zero" when the chipcard 101 is issued to the user, and if the password status is not at the original status "unchanged", this indicates that a digital signature not authorized by the holder of the chipcard 101 was generated before the chipcard was issued. When the signature password 205 has been changed for the first time, a document can be signed.

FIG. 5 shows the sequence of the signature process using an expanded signature key 202. The first part of this procedure comprises steps 501 to 510, which are the same as steps 301 to 310 in FIG. 3 for initial release of the signature key 202 and are not reproduced again in detail in FIG. 5.

If the signature passwords compared in step 505 (corresponding to step 305 in FIG. 3) are identical, in step 520 a check is made as to whether the signature counter 204 of the signature key 202 has the initial value "zero". If it does, the signing procedure is aborted in step 521 with an error message, since, as noted with reference to step 314 from FIG. 3, to create a signature the value of the signature counter must not correspond to the initial value.

Then, if the value of the signature counter is not "zero", in step 522 the chipcard program 106 requests information from outside the chipcard. This external information is preferentially a date and time, for example in the format "DDDDYYYYHHMMSS", which can be read from an item of PC hardware or PC software program for example. A further item of external information may be the identification number of the document to be signed, which could be read from the PC software program with which the document in question was created. The identification number and/or the license number of the signature program 105 used could also be applied as additional information.

Then, in step 523, the chipcard program 106 reads the internal information from the chipcard 101—that is, the value of the signature counter 204 of the relevant signature key 202 and the serial number 103 of the chipcard 101 from the memory of the chipcard 101. A further item of information which may be used for an expanded signature is an indication of which cryptographic method, for example RSA, is used to create the signature. This information was stored in the certificate 201 beforehand on creation of the signature key 202. A further item of information may be an identifying characteristic of the chipcard signing program 106 used, for example the license number or serial number of the program.

In step 524 the external and internal information together with the hash are merged on the chipcard 101 to form a signature data set for creation of the expanded digital signature. The hash, generated beforehand by the PC user program 104 in the PC 102, needs to be transmitted to the chipcard program 106 for this. The merger is effected by the chipcard program. In the process, the previously unused memory space which had merely been filled out with pads is filled out in a defined sequence by the additional external and internal information. Any remaining free capacity is then filled out with pads, as previously. With a view to a possible usage of the expanded signature as standard, binding definition of a standard sequence is necessary.

FIG. 6 shows a schematic representation of a conventional digital signature based on PKCS#1 (Public Key Cryptographic Standard). In the left-hand section there is a signature identifier (type block). In the right-hand section is the predefined data field in which the encrypted hash is stored. The hash is usually around 20 bytes big. The rest of the signature is filled out with 42, 74 or 106 bytes of pads, depending on the length of the signature key 202 used.

As shown in FIG. 5, following on from step 524 the signature data set created in this way is then encrypted by means of the signature key 202. An expanded digital signature is created. This encryption takes place on the chipcard 101. The current value of the signature counter 204, the serial number 103 of the chipcard 101 and the other additional items of information as part of the signature data set are signed, together with the hash, with the signature key 202.

FIG. 7 shows an expanded digital signature of such a kind. In addition to the hash, it also shows the value of the signature counter 204 and the serial number 103 of the chipcard 101, as well as additional internal and external information inserted as signature data. The additional items of information in this example are an identifier (ID) for the chipcard signing program 106, the date and time, and an identifier for the signed document. The preferred size of the individual items of information is given in bytes. The format of the resulting signature is compatible with that from the previous existing method. The previously free capacity of pads is used for useful information, based on which the hardware and software environment used are unambiguously identified.

Through the inclusion of additional information in the digital signature an expanded digital signature is delivered which provides indications of the hardware and software environment used in the signing process. In this, in particular the two values signature counter 204 and serial number 103 originating from the chipcard 101 are incorruptible.

The sequence of the signatures effected with a specific chipcard 101 can thus be defined in a binding manner by the sender. Also, the recipient of several documents with an expanded sender's signature has the possibility of ascertaining the order in which the documents were signed. This can be beneficial, for example, where the time of signing a document is decisive.

Based on the present invention, the holder of the chipcard 101 can ascertain whether other (unauthorized) signatures have been created with his or her chipcard 101 since the last (authorized) creation of a digital signature with the chipcard 101. He or she can also determine the number of such signatures. Thus if the signature counter 204 has increased by "n" since the last authorized use, this indicates that a digital signature has been generated without the authorization of the holder of the chipcard 101 since the last use of the relevant signature key 202. It may be helpful in determining the value of the signature counter 204 to display this value to the user of the chipcard 101 during signing. To ascertain the value of the signature counter 204 subsequently in the signature of a previously transmitted document, the storage of all documents to which a digital signature has been appended is beneficial.

If the chipcard 101 is lost and then found again, by checking the signature counter 204 and comparing the counter value against the last authorized signature it is easy to ascertain whether the signature key 202 has been abused. Accordingly, the digital signatures with the counter values "n+1" to "m−1"—with "m" representing the current counter reading—were unauthorized. The documents containing the unauthorized signature can be unambiguously identified based on the reading of the signature counter 204 and rejected.

Unique allocation of a signature to a specific chipcard 101 is also ensured. The user of a chipcard 101 can thus ascertain whether a specific signature really was generated with his or her chipcard.

Since the structure of the digital signature is defined, on the recipient's side it is easy to isolate and evaluate the corresponding additional information. This could be effected by an adapted software program on the recipient's PC.

As shown in step 526 in FIG. 5, the signature counter 204 of the signature key 202 used is increased by the value "one" every time a digital signature is generated. This numbers the digital signatures in the order in which they were created.

The expanded digital signature is transmitted to the signing program 105 in step 527. Generation of the expanded digital signature thus ends in step 528. The digital signature generated in this way can now be appended to the document for transmission. This may be effected by the expanded signature being passed by the signature program 105 to the PC user program 104, where it is then linked to the document for transmission.

A further preferential embodiment of the invention, as also shown in FIG. 4 for example, is that before and/or during signing the value of the signature counter 204 and the password status are displayed to the user of the chipcard 101. To further increase security and to provide closer monitoring, the serial number 103 of the chipcard 101 may also be displayed during the signing operation. This enables the user of the chipcard 101 to verify that the chipcard is in perfect undisturbed order.

The invention claimed is:

1. A method for generating a digital signature in a signature device having a signature program and certificate with signature key stored thereon for the signing of a document, wherein the digital signature identifies said device and at least one characteristic of the hardware and software environment used for generating said digital signature in said signature device, comprising the steps of:
   a) receiving input information to said signature device; and
   b) executing said signature program by the steps of: creating a signature data set comprising at least the received information, an identifier to identify said signature device, at least one identifying characteristic of the hardware and software environment used for generating said digital signature, and a document extract value of the document for signing; and creating an expanded digital signature by encrypting the signature data set with the aid of a signature key stored in said certificate.

2. The method in accordance with claim 1, wherein said receiving input information comprises procuring the value of a signature counter from said signature device.

3. The method in accordance with claim 2, further comprising, prior to said procuring, creating the signature counter as an attribute of the signature key.

4. The method in accordance with claim 1 wherein the receiving input information comprises procuring the identifying characteristic to identify the signature device from said signature device.

5. The method in accordance with claim 1, wherein the receiving input information comprises procuring information as to the hardware and software environment used in creating the digital signature.

6. The method in accordance with claim 1, further comprising entering an identifying characteristic to identify a holder of the signature key prior to said receiving input information.

7. The method in accordance with claim 6, further comprising creating the identifying characteristic to identify the holder of the signature key as an attribute of the signature key.

8. The method in accordance with claim 7, further comprising changing the identifying characteristic to identify the holder of the signature key prior to said receiving.

9. An electronic signature device for generating a digital signature to sign a document comprising:
   a) a receiver for receiving input information;
   b) at least one storage location for storing at least a signature program and a certificate with signature key;
   c) a data processor component for executing said signature program comprising at least a component for creating a signature data set comprising at least the received information, an identifier to identify said signature device, at least one identifying characteristic of the hardware and software environment used for generating said digital signature, and a document extract value of the document for signing; and
   d) an encryption component for creating an expanded digital signature by encrypting the signature data set with the aid of a signature key stored at said signature device.

10. The signature device in accordance with claim 9, wherein the device is a chipcard.

11. A program storage device readable by machine, tangibly embodying a program of instructions executable by the machine to perform method steps for generating a digital signature to sign a document in a signature device having a signature program and certificate with signature key stored thereon, said method steps comprising:
   a) receiving input information to said signature device; and
   b) executing said signature program by the steps of: creating a signature data set comprising at least the received information, an identifier to identify said signature device, at least one identifying characteristic of the hardware and software environment used for generating said digital signature, and a document extract value of the document for signing; and creating an expanded digital signature by encrypting the signature data set with the aid of a signature key stored in said certificate.

12. The method in accordance with claim 1, wherein said at least one identifying characteristic comprises information which uniquely identifies said digital signature in relation to every other digital signature generated with the same signature key.

* * * * *